United States Patent
Tsuchinaga et al.

(10) Patent No.: US 7,949,016 B2
(45) Date of Patent: May 24, 2011

(54) INTERACTIVE COMMUNICATION SYSTEM, COMMUNICATION EQUIPMENT AND COMMUNICATION CONTROL METHOD

(75) Inventors: Yoshiteru Tsuchinaga, Yokohama (JP); Yasuji Ota, Kawasaki (JP); Masanao Suzuki, Kawasaki (JP); Masakiyo Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 813 days.

(21) Appl. No.: 11/111,759

(22) Filed: Apr. 22, 2005

(65) Prior Publication Data
US 2005/0185678 A1 Aug. 25, 2005

Related U.S. Application Data

(63) Continuation of application No. PCT/JP02/11107, filed on Oct. 25, 2002.

(51) Int. Cl.
*H04J 3/12* (2006.01)
(52) U.S. Cl. .......................... 370/528; 370/529; 370/241
(58) Field of Classification Search .................. 370/474, 370/352, 349, 235, 389, 401, 528, 529; 714/797–755
See application file for complete search history.

(56) References Cited

U.S. PATENT DOCUMENTS

| | | | |
|---|---|---|---|
| 5,509,007 A | | 4/1996 | Takashima et al. |
| 5,546,395 A | | 8/1996 | Sharma |
| 5,694,428 A | * | 12/1997 | Campana, Jr. ............... 375/260 |
| 5,710,798 A | * | 1/1998 | Campana, Jr. ............... 375/347 |
| 6,914,903 B1 | * | 7/2005 | Miyazaki et al. ............ 370/389 |
| 7,317,738 B2 | * | 1/2008 | Kawamae et al. ........... 370/535 |

FOREIGN PATENT DOCUMENTS

| | | |
|---|---|---|
| JP | 5-336159 | 12/1993 |
| JP | 10-56480 | 2/1998 |
| JP | 11-177518 | 7/1999 |
| JP | 2000-134284 | 5/2000 |
| JP | 2000-253187 | 9/2000 |
| JP | 2002-152228 | 5/2002 |
| WO | 01/67671 | 9/2001 |

OTHER PUBLICATIONS

Supplementary European Search Report dated Nov. 29, 2010 in Application No. 02777960.2.
Bruhn et al., "Concepts and Solutions for Link Adaptation and Inband Signaling for the GSM AMR Speech Coding Standard", Vehicular Technology Conference, 1999 IEEE, Houston, TX May 16-20, 1999, pp. 2451-2455.
Japanese Office Action issued Nov. 10, 2006 in corresponding Japanese patent application No. 2004-546379.

* cited by examiner

*Primary Examiner* — Ricky Ngo
*Assistant Examiner* — David Oveissi
(74) *Attorney, Agent, or Firm* — Staas & Halsey LLP

(57) ABSTRACT

Communications from a transmission side to a reception side neither changing the format of voice code data nor requiring another transmission path or increasing the transmission quantity of control information are controlled utilizing information obtained on the reception side. A system includes a first communication equipment provided with a control information embedding unit for embedding control information that is used for a control of communications from a communication partner to the own communication equipment and that is obtained on the own communication equipment side in the communication data to be transmitted to the communication partner side and a second communication equipment provided with a communication control unit for controlling communications to the first communication equipment side using control information transmitted from the first communication equipment.

7 Claims, 20 Drawing Sheets

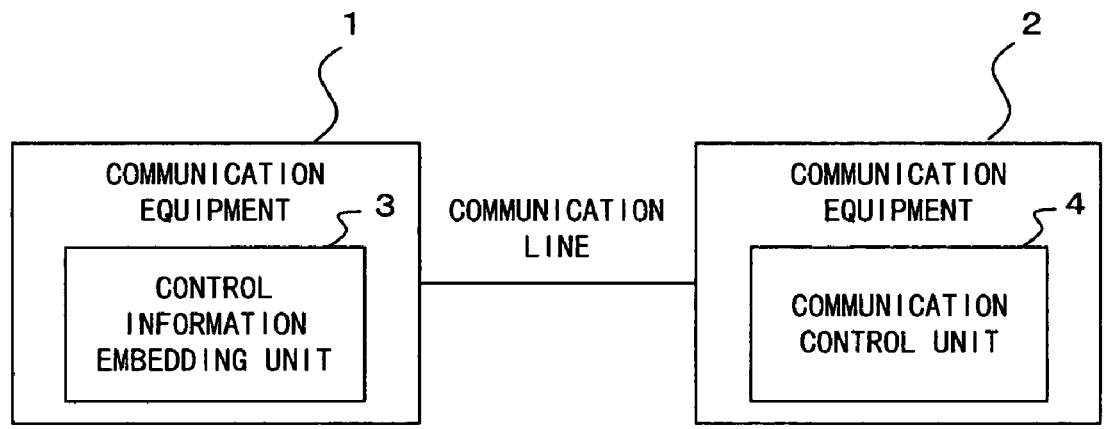
F I G. 1

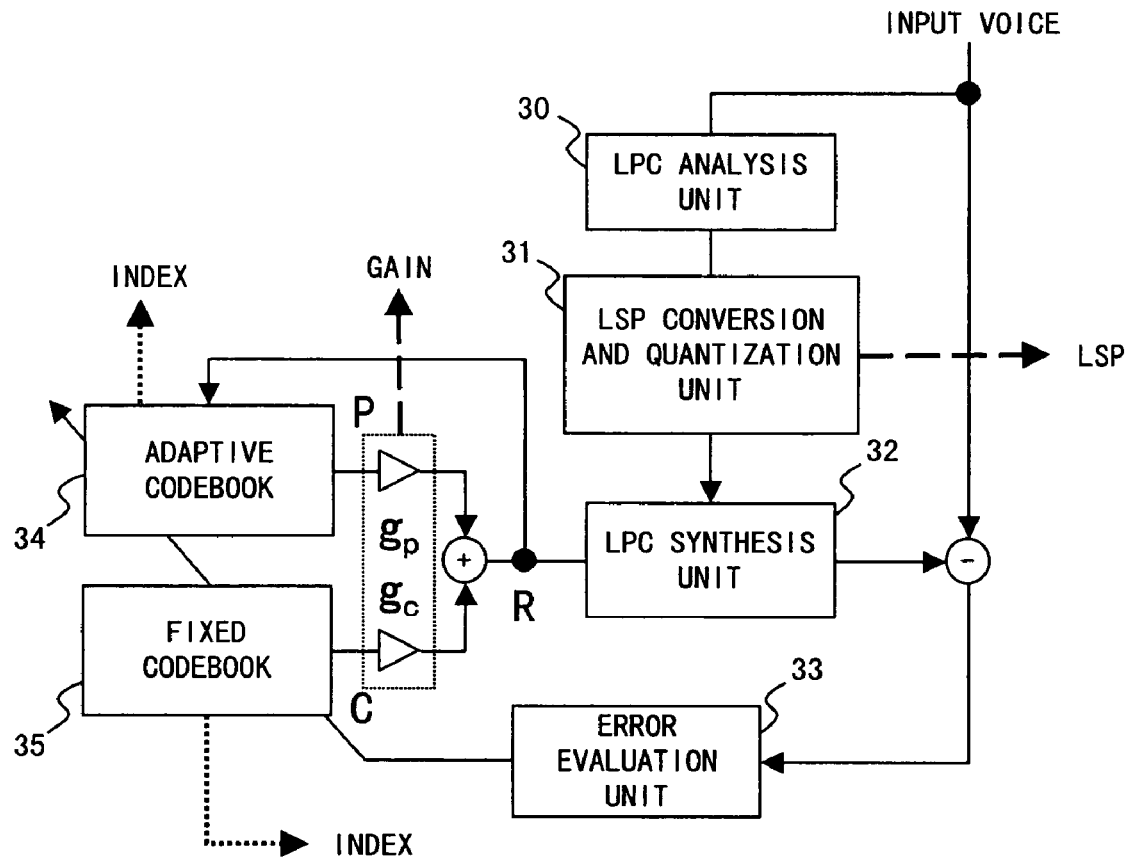
F I G. 4

| PULSE SERIES | PULSE POSITION |
|---|---|
| 0 | 0, 5, 10, 15, 20, 25, 30, 35 |
| 1 | 1, 6, 11, 16, 21, 26, 31, 36 |
| 2 | 2, 7, 12, 17, 22, 27, 32, 37 |
| 3 | 3, 8, 13, 18, 23, 28, 33, 38<br>4, 9, 14, 19, 24, 29, 34, 39 |

F I G. 7

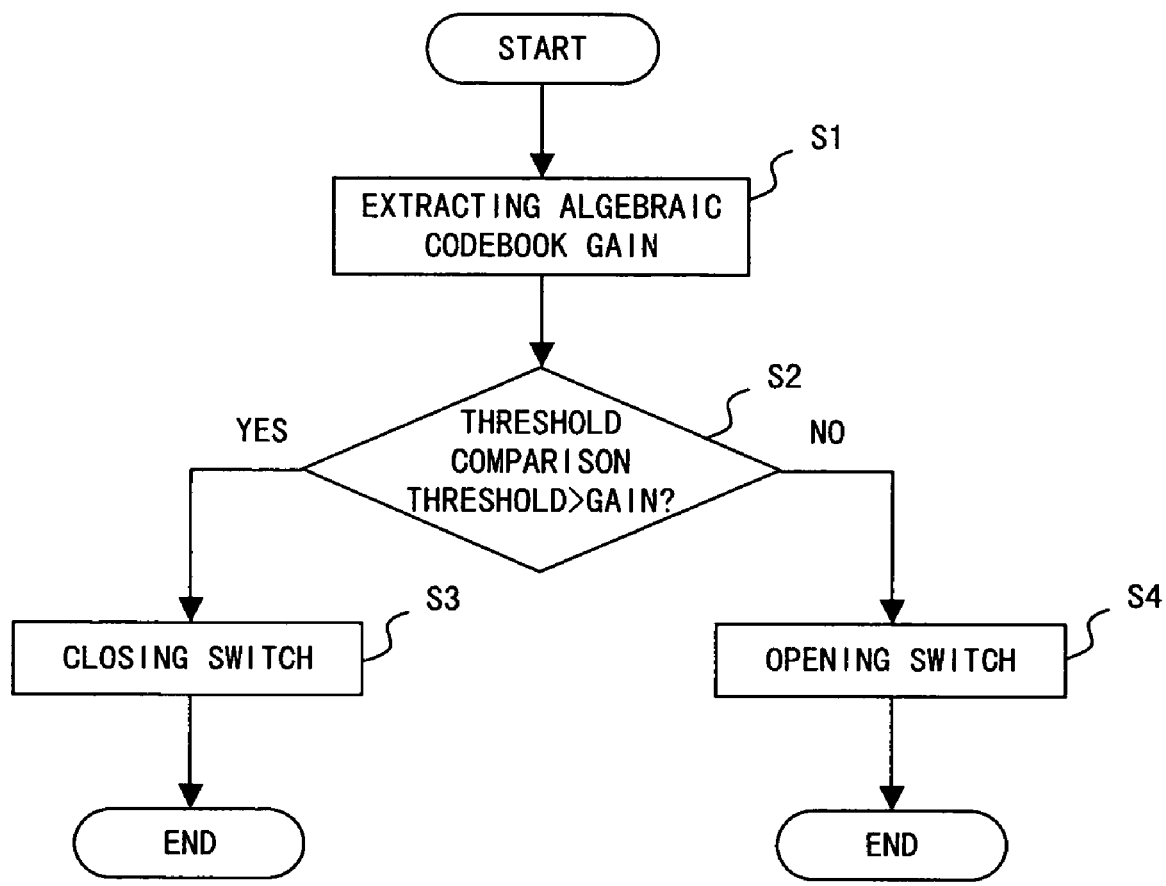
F I G. 1 1

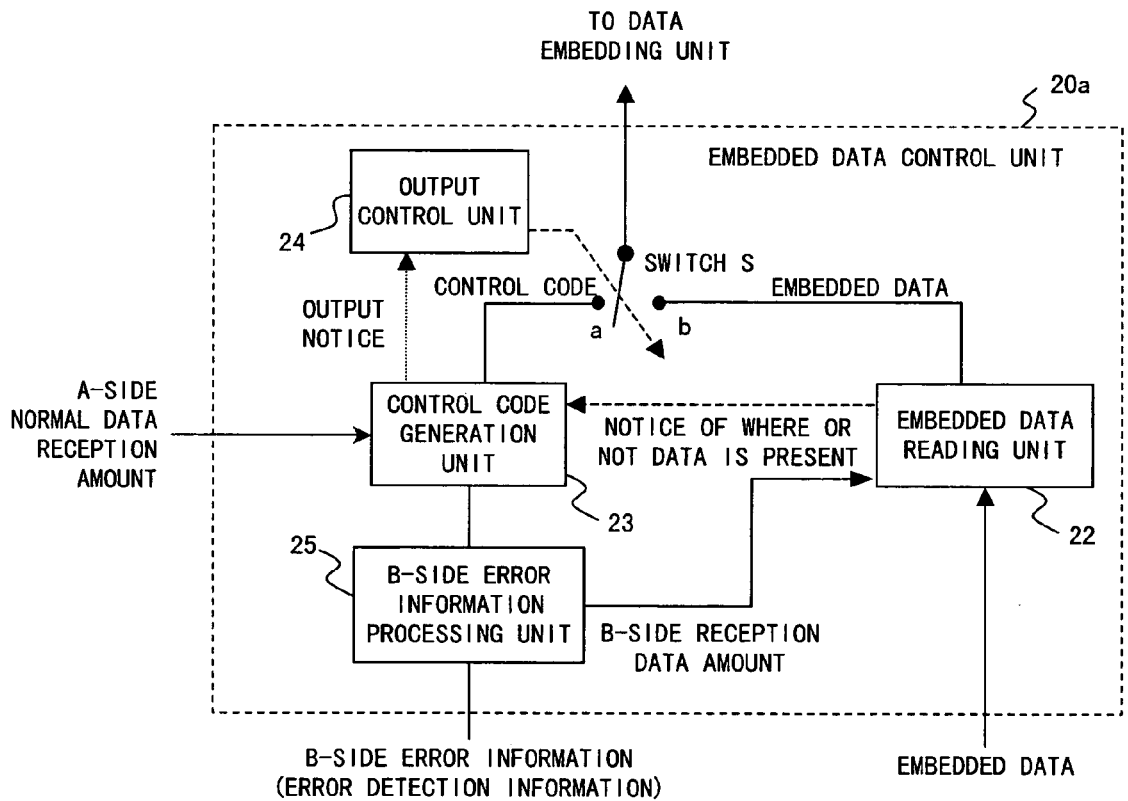
F I G. 1 7

INTERACTIVE COMMUNICATION SYSTEM, COMMUNICATION EQUIPMENT AND COMMUNICATION CONTROL METHOD

CROSS REFERENCE TO RELATED APPLICATION

This application is a continuation of international PCT application No. PCT/JP02/11107 filed on Oct. 25, 2002.

BACKGROUND OF THE INVENTION

1. Field of the Invention

The present invention relates to an interactive communication system. Specifically, it relates to an interactive communication system, a communication equipment and a communication control method, in this system. According to this interactive communication system, in the case where communications are implemented while other optional data is embedded in voice coded data, for example, in an interactive packet voice transmission system, etc., control information that is used for a control of communications from a transmission side to a reception side and that is obtained on the reception side is embedded instead of the other optional data and then this embedded data is transmitted to the transmission side, thereby controlling the communications on the transmission side using the control information.

2. Description of the Related Art

Along with the popularization of a computer and the Internet in recent years, an electronic watermark technology of embedding special data in multimedia contents (still image, animations, audio, voice, etc.) has been paid attention to. In many cases, such a technology aims at copyright protection that prevents illegal copy or falsification of data by embedding the name of a producer or a distributor of the contents in the contents. In addition, this technology aims at increasing the user's convenience when he or she uses the contents by embedding information related to the contents and additional information.

Also, in the field of a voice communication such as VoIP (voice-over IP) used as a technology of transmitting and receiving voice data using an IP (Internet protocol) network, a system of embedding optional data in voice data and transmitting the thus-embedded data is used. FIG. 18 shows a conventional example of a voice communication system to which such a technology of embedding data is applied.

In, FIG. 18, a voice codec (coder) 50 embeds the optional data series other than voice in a voice code and transmits the thus-embedded code to a communication partner side at the time of coding the input voice from a user 1 into a voice code. If data can be embedded without changing the format of the voice code at that time, the information amount of the voice code is not increased.

A decoder 51 extracts the embedded optional data series from the transmitted voice code and at the same time it outputs the reproduced voice to a user 2 based on a general decoding operation. If the embedding of data is implemented without exerting an influence on the quality of the reproduced voice, there is almost no difference between the voice quality of the reproduced voice and that before the embedding operation is implemented. According to the above-mentioned configuration, optional data can be transmitted separately from the voice without increasing the transmission amount of data. Therefore, for the third person who does not know that data is embedded, this transmission is recognized as a general voice communication.

Furthermore, the various methods are used for the improvement of transmission efficiency and voice quality in a voice communication system. As one of these improvement methods, there is a method of implementing a transmission control on a transmission side utilizing the information that is obtained on a receive side. For example, a method of suitably changing the amount of information that is transmitted according to the condition of a transmission path (communication line) is used. FIG. 19 shows the first conventional example of a voice communication system that implements such a transmission control. In order to simplify the explanation in FIG. 19, the control information that is used for the control of the communications from a side A to a side B is obtained on the side B as B-side information, but it is natural that the reverse case is present.

In FIG. 19, information about the condition of a transmission path can be obtained on the side B from the information about voice data that is received from the side A. For example, in VoIP, information about the delay, the fluctuation and the error rate of a transmission path can be obtained from the header information of a transmission packet. These pieces of transmission path information are transmitted to the side A via a control data circuit and they are used on the side A for a transmission control by a transmission control unit 52.

In this way, it is possible to implement a suitable transmission control. For example, in the case where the load of a transmission path is large, a voice line is first secured by decreasing a transmission amount even if sound quality deteriorates. Furthermore, in the case where the load is small, sufficient sound quality is secured by increasing the transmission amount.

FIG. 20 shows the second conventional example of an interactive voice communication system that implements such a transmission control. In the same drawing, the B-side information is not transmitted to the side A via an exclusive control data line as shown in FIG. 19 but it is multiplexed together with voice data by a multiplexing unit 53 using a multiplex line and then the thus-multiplexed data is transmitted. Subsequently, the transmitted data is demultiplexed by a demultiplexing unit 54 on the side A to be used for a transmission control.

There are following four documents as conventional technologies related to the embedding of data. At first, a document 1 discloses an image coding apparatus that embeds the other kind of information in image information for one screen and compression-codes the embedded information. In other words, this technology discloses a technology of replacing the subordinate digit of the transformation coefficient that satisfies a specified criterion in respect of alternate components, with the partial information that is clipped from the other information, from among transformation coefficients generated by discrete cosine transformation.

In a document 2, a voice communication method of implementing communications by embedding the bits that configure data obtained by coding character information, image information, etc. in low n bits of digital voice data.

A document 3 discloses a technology of transmitting non-verbal information with the bit that is assigned to the output or outputs of one or both codebook(s) by setting the gains of an adaptive codebook and a fixed codebook that are described later at 0 in preferred embodiments of the present invention while targeting a radio voice channel.

A document 4 discloses an electronic watermark technology using a specified key that is shared with a transmission side and a reception side while targeting a CELP (code excited linear prediction) coding system which is described later.

Document 1: Japanese patent application laid-open publication No. 2000-287209, "Image coding apparatus, image decoding apparatus, image coding method and image decoding method"

Document 2: Japanese patent application laid-open publication No. 9-214636, "Voice communication method and apparatus of embedding data"

Document 3: Japanese patent application laid-open publication No.2000-209663, "Method of transmitting nonverbal voice information on voice channel"

Document 4: Japanese patent application laid-open publication No. 11-272299, "Embedding method of watermark bit when voice is coded"

The following is the explanation of the problems of the above-mentioned conventional technologies. First of all, in the conventional examples explained in FIGS. 19 and 20, an exclusive control data line is required or multiplexed transmission with voice information is required in order to transmit control information from a reception side to a transmission side. Therefore, there is a problem such that another transmission path is secured or the increase of transmission amount for the transmission of control information in addition to the voice information should be considered as mentioned above.

In the documents 1 and 2, an embedding parameter such as the embedding position of other data in image data or in voice data is defined in advance on a transmission/reception side and then the embedding and extraction of data are implemented. In the case where the embedding position of such data, for example, the value of n is changed in the document 2, it is necessary to transmit the changed value as a control parameter from, for example, a transmission side. In the case where such data disappears due to the condition of a transmission path, there arises a problem such that it is difficult to precisely determine on a reception side in which position of the received voice code the data is embedded.

It takes a time for a transmission parameter to return to a normal value especially in the case where the condition of the past frame effects on the condition of the present frame. In respect of voice data, an error concealment technology of preventing the extreme deterioration of the sound quality can be also applied but problems regarding the transmission parameter or embedded data still remain.

Furthermore, in the documents 2 and 3, there is a problem such that the deterioration of a voice signal is generated due to the size of the value of n. Also in the document 4, there is a problem such that the possibility of voice deterioration by embedding data is high since the presence or non-presence of data is controlled with probability corresponding to the position of the pulse of a fixed codebook in addition to a problem such that data can be falsified or the like by stealing a key.

The subject of the present invention is to implement a control of communications from a transmission side to a reception side by neither additionally securing a transmission path for transmitting the control information nor increasing a transmission amount due to the control information utilizing the information that is obtained on the reception side while the above-mentioned problem is considered and the format of voice code data remains as it is.

Another subject of the present invention is to prevent the disappearance of the embedded data by re-transmitting the embedded data even in the case where a communication error is generated due to the condition of a transmission path.

SUMMARY OF THE INVENTION

The communication equipment of the present invention configures an interactive communication system, that is, a system of including a plurality of communication equipments that are connected to each other via a communication line and this equipment is provided with at least a control information embedding unit.

The control information embedding unit embeds control information that is used for a control of communications from a transmission side and that is received on a reception side, in transmission data to be transmitted to the transmission side via a communication line, for example, this unit embeds information showing the condition of a communication line from the transmission side to the reception side as control information.

In the interactive communication system of the present invention, at least the first communication equipment and the second communication equipment are connected via a communication line. The first communication equipment is provided with a control information embedding unit embedding control information that is used for a control of the communications from the second communication equipment to the own communication equipment and that is obtained by the own communication equipment, in the communication data to be transmitted to the second communication equipment. The second communication equipment is provided with a communication control unit controlling the communications from the own equipment to the first communication equipment using the transmitted control information.

The communication control method of the present invention comprises a step of embedding the control information that is used on the first communication equipmentside for a control of the communications from the second communication equipmentside and that is obtained on the reception side, in the communication data to be transmitted to the second communication equipment and a step of controlling on the second communication equipment, the communications to the first communication equipmentside using the transmitted control information.

BRIEF DESCRIPTION OF THE DRAWINGS

FIG. 1 is a block diagram that shows the principle configuration of the present invention;

FIG. 4 is a diagram that explains the encoding process of a CELP voice coding system;

FIG. 7 is a diagram that shows the position of a pulse in an algebraic codebook;

FIG. 11 shows a flowchart of the processes of an embedding control unit;

FIG. 17 is a block diagram that shows the functional configuration of an embedding data control unit;

DESCRIPTION OF THE PREFERRED EMBODIMENTS

Figure 2:
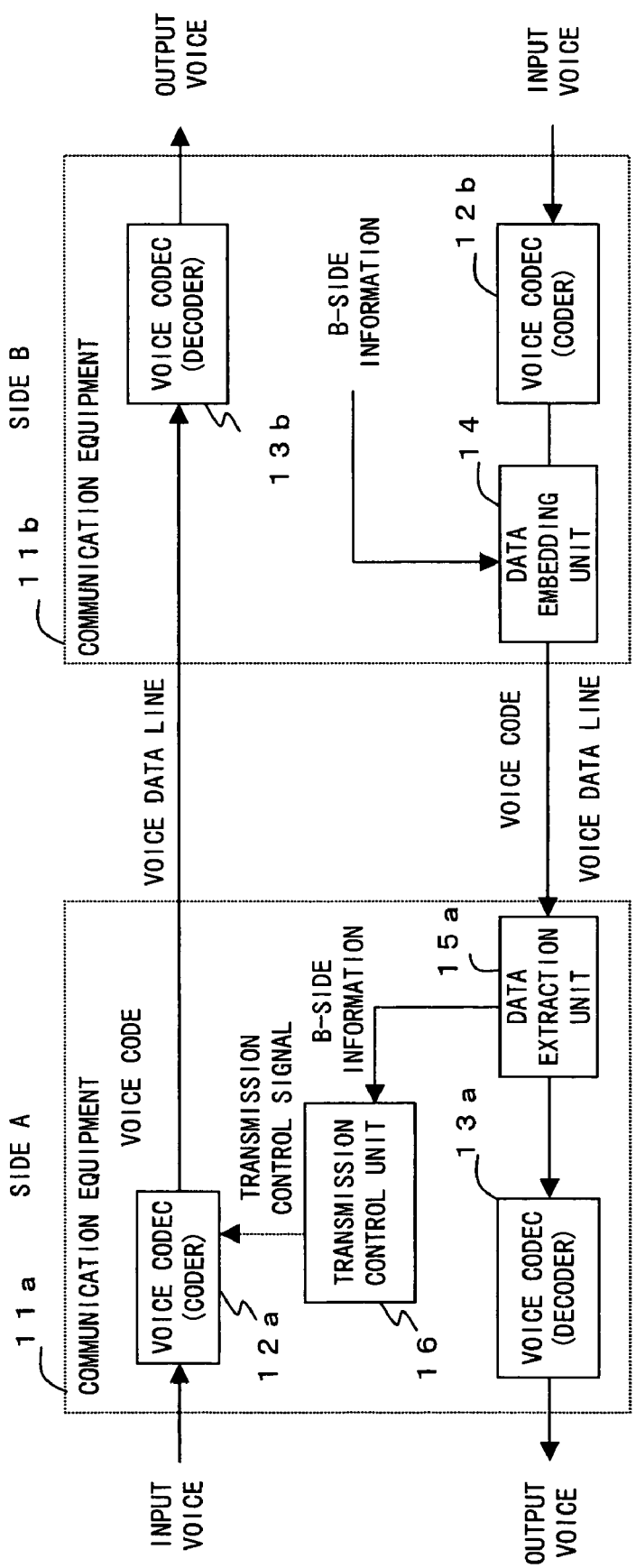
FIG. 2 is a block diagram that shows the first fundamental configuration example of an interactive communication system of the present invention.

FIG. 1 is a basic configuration block diagram of the interactive communication system according to the present invention. In the drawing, the (first) communication equipment 1 is provided with a control information embedding unit 3 while the (second) communication equipment 2 is provided with a communication control unit 4.

The control information embedding unit 3 embeds the control information that is used for a control of communications from the communication equipment 2 that is a communication partner to the own communication equipment 1 and that can be obtained on the side of the communication equipment 1, in the communication data to be transmitted to the side of the communication equipment 2. The communication control unit 4 controls the communications from the communication equipment 2 to the communication equipment 1 using the control information that is embedded in the communication data to be transmitted from the communication equipment 1.

In a preferred embodiment of the present invention, the following configuration can be adopted. The communication equipment 1 further comprises an error detection unit that detects a communication error when communications are implemented from the communication equipment 2 to the communication equipment 1 of FIG. 1 by embedding optional data in the main communication data. The control information embedding unit 3 embeds the error detection information as control information when a communication error is detected. In addition, the communication equipment 2 further comprises an embedding re-execution control unit that controls the embedding re-execution of other optional data, corresponding to the error detection information that is transmitted from the communication equipment 1. Furthermore, the communication equipment 1 comprises an extracted data monitoring unit monitoring the normal reception amount of other optional data that is embedded in the main communication data transmitted from the communication equipment 2. The control information embedding unit 3 embeds the information about the data normal reception amount before an error is detected in addition to the error detection information when a communication error is detected. The embedding re-execution control unit on a side of the communication equipment 2 also controls the embedding re-execution of optional data after eliminating the part that is shown by the data normal reception amount.

In the present invention, the communication equipment 1 in the interactive communication system comprises at least the control information embedding unit 3. In the preferred embodiment, the control information that is embedded by the control information embedding unit 3 can be the information that shows the condition of a transmission path (communication line) from the transmission side to the reception side.

In the preferred embodiment of the present invention, when communications are implemented from the transmission side to the reception side by embedding other optional data in the main communication data, it is possible that the communication equipment 1 further comprises an error detection unit that detects a communication error and the control information embedding unit 3 embeds error detection information as control information when a communication error is detected due to the condition of a transmission path. In addition, the communication equipment 1 further comprises a normal data reception amount monitoring unit that monitors the normal reception amount of other optional data before a communication data error is detected and the control information embedding unit 3 further embeds the normal reception amount in addition to the error detection information when a communication data error is detected.

Furthermore, in the preferred embodiment, when the interactive communication system is a voice communication system that uses a CELP (code excited linear prediction) coding system and when other optional data is embedded in voice code data, a determination parameter that is used to determine whether or not the embedding operation is implemented in the voice coding data, a threshold used for the determination and a data embedding target parameter in the voice coding data are agreed mutually between the transmission side and the reception side.

In the preferred embodiment, when the control information that is used for a control of the communications from the transmission side is obtained on the reception side while implementing communications from the reception side to the transmission side after embedding other optional data in the main communication data, the control information unit 3 can embed the control information in preference to other optional data.

According to the communication control method of the present invention, this method includes a method of embedding on the first communication equipment, the control information that is used for the control of the communications from the second communication equipment side and that is obtained on a side of the first communication equipment, in the communication data that is transmitted to the second communication equipment, thereby controlling on the second communication equipment, communications to the first communication equipment using the control information that is embedded in the communication data to be transmitted from the first communication equipmentside.

According to the present invention, the control information that is used for the control of the communications from a transmission side to a reception side and that is obtained on the reception side is embedded in the communication data from the reception side to the transmission side to be transmitted to the transmission side and then the thus-transmitted data is used for a control of the communications.

FIG. 2 is a block diagram that shows the first fundamental configuration of an interactive communication system in the preferred embodiment of the present invention. In this drawing, interactive communications, for example, voice communications are implemented between a communication equipment 11a on a side A and a communication equipment 11b on a side B.

In the same drawing, for the control of communications that are implemented toward the communication equipment 11b from the communication equipment 11a, in other words, for the control of the transmission of a voice code via a voice data line, the information that is obtained on the side B is used. A data embedding unit 14 embeds the information that is obtained on the side B in the input voice that is coded by a voice codec (coder) 12b on the side B and the thus-embedded voice is transmitted to the communication equipment 11a on the side A via the voice data line. In respect of the embedding of the B-side information, a data embedding system using a CELP (code excited linear prediction) system that is described later is used.

On the communication equipment 11a side, the B-side information from the voice code that is transmitted from the side B by a data extraction unit 15a, that is, the B-side information that is obtained on the side B and is used for the control of the communications from the side A to side B is extracted. Then, the extracted voice data is decoded by a voice codec (decoder) 13a and the thus-decoded data is outputted as output voice.

The B-side information is given to a transmission control unit 16 and this information is used for the control of the transmission of the voice code that is outputted from a voice codec (coder) 12a to the side B as the transmission control signal from the transmission control unit 16. The voice code that is controlled by the B-side information is given to a voice codec (decoder) 13b on the side B via the voice data line. The thus-decoded data is outputted as output voice.

Figure 3:
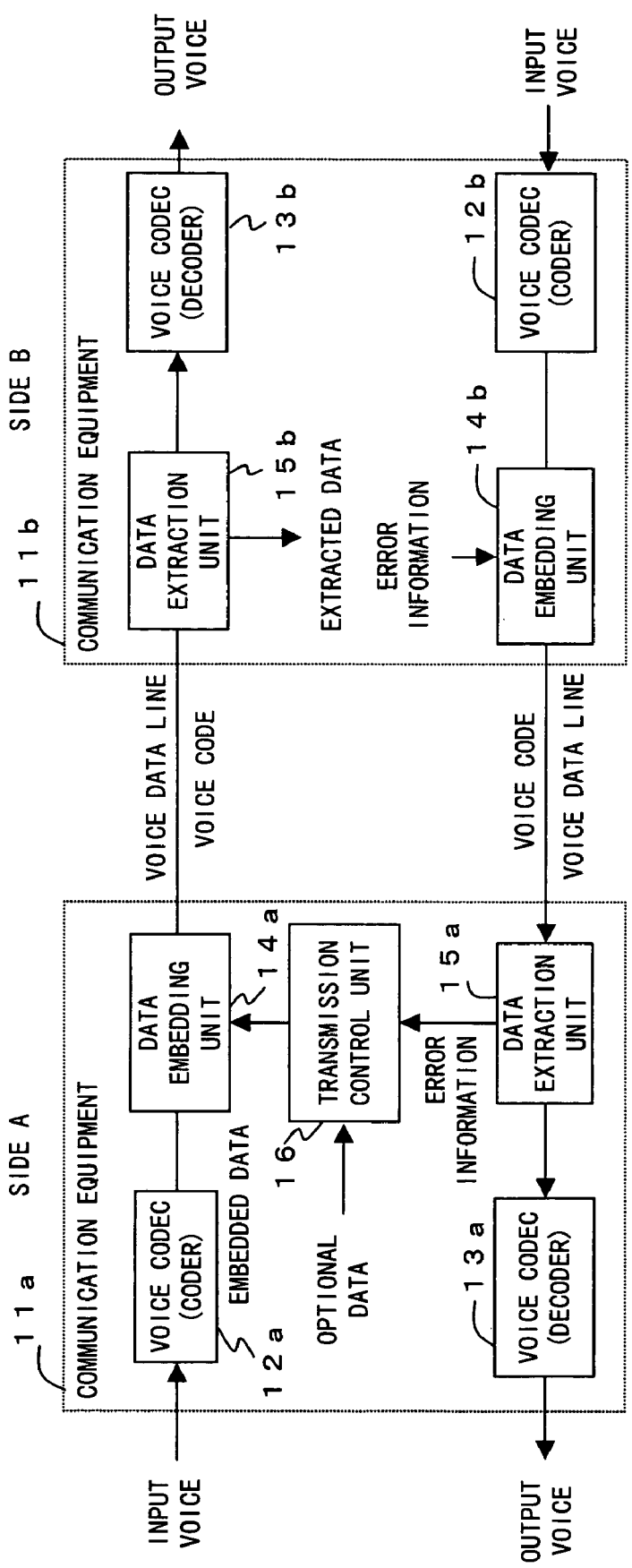
FIG. 3 is a block diagram that shows the second fundamental configuration example of the interactive communication system of the present invention.

FIG. 3 is a block diagram that shows the second fundamental configuration of a communication system in the present embodiment. In FIG. 3, the data embedding unit 14a in the communication equipment 11a on the side A embeds the optional data that is given via the transmission control unit 16, for example, the data of the media different from the voice, in the voice code data functioning as the output of the voice codec (coder) 12a, which is different from the processes in FIG. 2. Then, the embedded voice code data is transmitted to the side B via the voice data line.

The optional data that is embedded is extracted from the voice code data by a data extraction unit 15b on the side B and the extracted data is used as extraction data on the side B.

In the case where the optional data that is embedded in the voice code data disappears on the side A as mentioned above, for example, the re-transmission of embedded data becomes required. Accordingly, in the case where a communication error is detected, for example, in the case where the omission of the sequence number that is stored in the header of a transmission packet is detected, the detection result is given as error information to a data embedding unit 14b in the communication equipment 11b on the side B as information corresponding to the B-side information in FIG. 2. In the same way as in FIG. 2, this information is embedded in the voice coded data to be transmitted to the side A. Then, this error information is extracted by the data extraction unit 15a to be given to the transmission control unit 16 and this unit controls the embedding of optional data, that is, the re-transmission of embedded data so that the optional data is embedded in the voice coded data to be transmitted once again to the side B.

FIGS. 2 and 3 explain the case where the information that is obtained on the side B is used as the control information in the communications from the side A to the side B. The communications that are implemented here are interactive communications. On the contrary, it is also possible that the A-side information that is obtained on the side A and is used for a control of the communications from the side B to the side A is embedded in the voice coded data to be transmitted from the side A to the side B.

Before further explaining about the preferred embodiments of the present invention, a method of embedding data that is used in the preferred embodiments of the present invention is explained in reference to FIGS. 4 to 9.

As a method of embedding data, various methods have been proposed. Here, the following is the explanation of a method of embedding data regarding a CELP system that is a base algorism of a voice coding technology such as G. 729 that is regulated by ITU-T (International Telecommunication Union, Telecommunication standardization sector) that is an international standardization organization or a voice coding technology such as AMR (Adaptive•Multi•Rate) that is regulated by 3GPP (the third Generation Partnership Project) in the field of mobile communications.

The characteristics of this method are as follows: Firstly, it is possible to embed optional data without changing the format of coded data. Secondly, it is possible to embed optional data while minimizing the influence on the reproduction sound quality. Thirdly, it is possible to adjust an embedding data amount while predicting the influence on the reproduction sound quality. Fourthly, it is possible to apply the above-mentioned method to a wide range of methods based on a CELP system.

FIG. 4 is the diagram explaining a transmission-side processing, in other words, a coding processing of a CELP voice coding system. CELP is a technology of extracting a parameter from inputted voice by making an analysis using a voice generation model of a human being, thereby transmitting the parameter. At first, an LPC analysis unit 30 extracts an LPC (Linear Prediction Coefficient) from the input voice. This coefficient is obtained by approximating a vocal tract characteristic when a human being produces a sound, using an all-pole linear filter. This coefficient is converted into an LSP (Line Spectrum Pair), etc. by an LSP conversion and quantization unit 31 as a parameter that shows a frequency characteristic and then the thus-converted parameter is quantized to be transmitted to the reception side.

Then, a parameter for the sound source signal is extracted. In other words, a plurality of candidates is prepared as a codebook. The optimum series (code word) is selected as a sound source. The selected code word is transmitted as an index that shows the storage place. The codebook includes two kinds of codebooks such as an adaptive codebook 34 for expressing a pitch and a fixed codebook 35 for expressing a noise series. Furthermore, the gain for the amplitude adjustment of each code word is also quantized and the thus-quantized gain is transmitted as a parameter.

Figure 5:
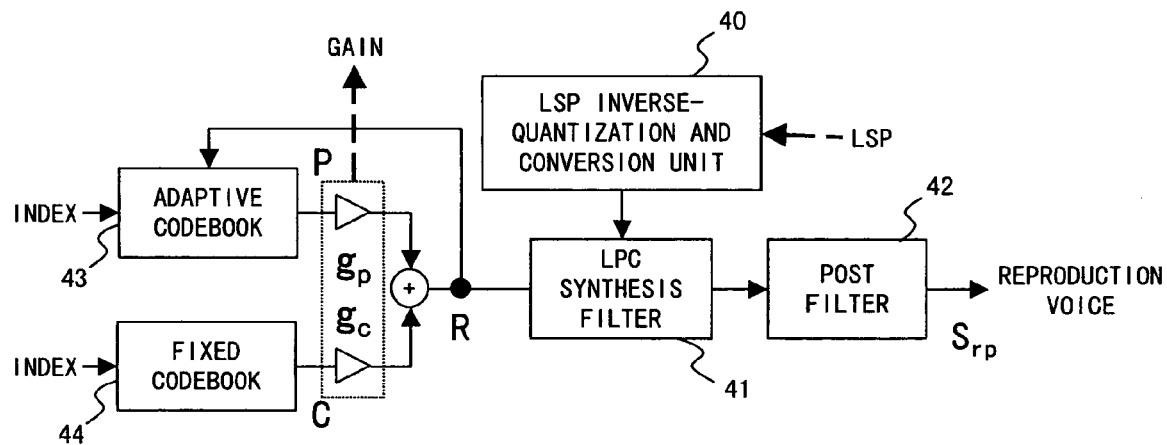
FIG. 5 is a diagram that explains the decoding process of the CELP voice coding system.

FIG. 5 is a diagram explaining a reception-side processing, in other words, a decoding processing of a CELP voice coding system. In this decoding processing, a processing of simulating a voice generation series is implemented. In other words, the code words in the adaptation codebook 43 and the fixed codebook 44 are selected using the index that is transmitted from the transmission side. Then, a sound source signal R is generated using both the code word and the information about the gain, thereby reproducing voice by a synthesis filter 41 that uses LPC as the conversion result of the LSP transmitted from the transmission side. In this way, the transmission parameter that is coded by the CELP system corresponds to the characteristic parameter of a voice generation system. By using this transmission parameter, reproduction voice is obtained by the following equation.

$$S_{rp}=HR=H(g_pP+g_cC)$$

Where $S_{rp}$ is reproduction voice, R is a sound source signal, H is a synthesis filter, $g_p$ is an adaptive code word gain, P is an adaptive code word, $g_c$ is a fixed code word gain and C is a fixed code word.

The respective gains regarding two kinds of code words as sound source signals, that is, an adaptive code word corresponding to a pitch and a fixed code word corresponding to noise become factors each of which shows the degree of the contribution to the reproduction voice of each code word. In other words, the degree of the contribution of the corresponding code word becomes small in the case where the gain is small.

Thereupon, it is determined that the degree of the contribution of the corresponding code word is small in the case where the gain is equal to or less than a certain threshold using this gain as a determination parameter. Accordingly, optional data can be embedded instead of the index regarding the code word. In this way, the influence of embedding data can be minimized. Furthermore, an embedding data amount can be adjusted by controlling the threshold while predicting the influence on the reproduction sound quality.

If only the initial value of the threshold is defined in advance on both transmission and reception sides, the writing in/reading out of embedded data becomes possible by using a determination parameter as a threshold, an index as a parameter to be embedded or optional data. Furthermore, by defining a control code, etc. as optional data, the change of a threshold becomes possible so that the transmission amount of the embedded data can be adjusted without transmitting control information via another path.

By setting the CELP system as a basic system in this way, it becomes possible to embed optional data in voice code data without changing the voice code format. In other words, ID and information about the other medium can be embedded in voice information neither deteriorating the fundamental system in the communication system nor being recognized by a user and then the thus-embedded information can be transmitted. Furthermore, by using a parameter such as a gain, an adaptation/fixed codebook, etc. that are common in CELP, this system can be applied to various systems.

Figure 6:
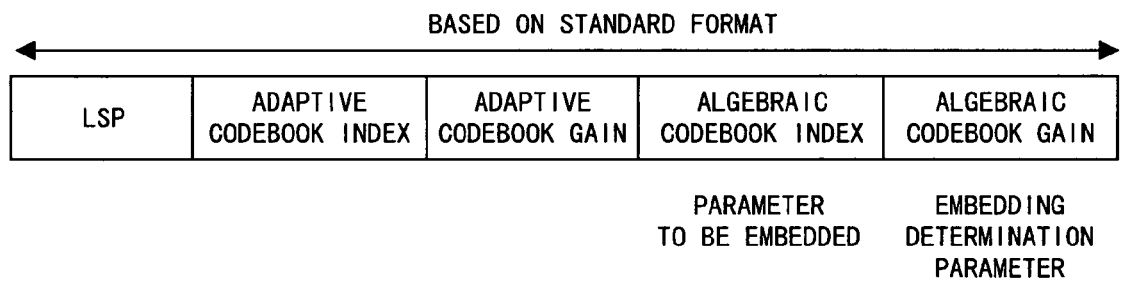
FIG. 6 is a diagram that shows the standard format of a voice code in preferred embodiments of the present invention.

Each of FIGS. 6 to 9 is a diagram explaining a voice code format for embedding data based on the present preferred embodiment. In the present preferred embodiment, an algebraic codebook is used as a fixed codebook for the above-mentioned noise. FIG. 6 shows the standard form of a voice code format. This drawing shows the case where the embedding of optional data is not implemented, and the index and gain of an algebraic codebook are stored in a voice code in addition to the index and gain of an adaptation codebook. The algebraic codebook index is used as an embedding target parameter, in other words, a region where optional data can be embedded. The algebraic codebook gain is used as a storage region of an embedding determination parameter, in other words, a parameter to be compared with a threshold.

Here, the algebraic codebook is further explained using FIG. 7. An algebraic codebook is used to quantize the noise component that is included in a sound source signal and this codebook includes a plurality of pulses the amplitudes of which are 1 or -1. FIG. 7 shows the position of a pulse in the algebraic codebook that is adopted in G. 729. In G. 729, a frame having a length of eighty samples (10 ms) is divided into two sub-frames having lengths of forty samples (5 ms) and the noise component is quantized. Then, four pulses are arranged for each sub-frame.

In FIG. 7, pulse series 0 to 3 show four pulses and the positions of pulses that can be arranged from among forty samples are shown for each pulse.

When an algebraic codebook is retrieved, a combination, such that the error electric power of input voice becomes minimum in a reproduction region, is determined from among combinations of the positions and amplitudes (codes) of the above-mentioned pulses. The information about the determined pulse position and the information about the determined code are transmitted to a reception side as algebraic codebook indexes.

In the case of G. 729, the positions (eight positions) of the respective pulses of the pulse series 0 to 2 are quantized with three bits, the positions (sixteen positions) of the pulses of the pulse series 3 are quantized with four bits and the code (-1 or 1) of each of four pulses is quantized with one bit. Accordingly, the number of bits of the algebraic code for each sub-frame becomes seventeen bits and the algebraic code of thirty-four bits is outputted for each frame.

Figure 8:
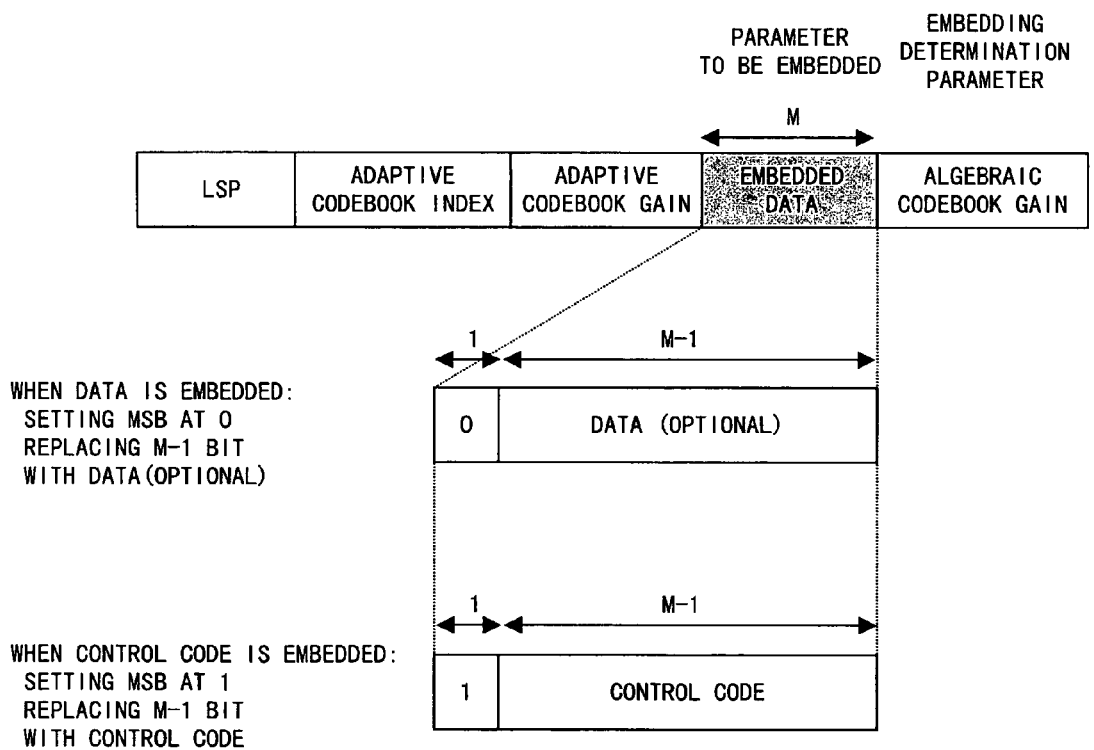
FIG. 8 is a diagram that shows the voice code format in which data is embedded according to the preferred embodiments of the present invention.

FIG. 8 shows the frame format in the case where optional data is embedded instead of an algebraic codebook index. In the case where the algebraic codebook gain as an embedding determination parameter is equal to or less than a predetermined threshold, optional data is embedded in the position of the algebraic codebook index as an embedding target parameter as shown in FIG. 6.

As mentioned above, the number of bits of the algebraic codebook index as an embedding target parameter is thirty-four for each frame. If the thirty-four bits are referred to as M bits, it can be determined from the contents of one bit of the MSB whether the embedded data is, for example, optional data of other media or a control code that is used for a communication control among communication equipments. By setting the MSB at "0", it is shown that the remaining (M-1) bits are optional data while by setting the MSB at "1", the remaining (M-1) bits are control codes.

Figure 9:
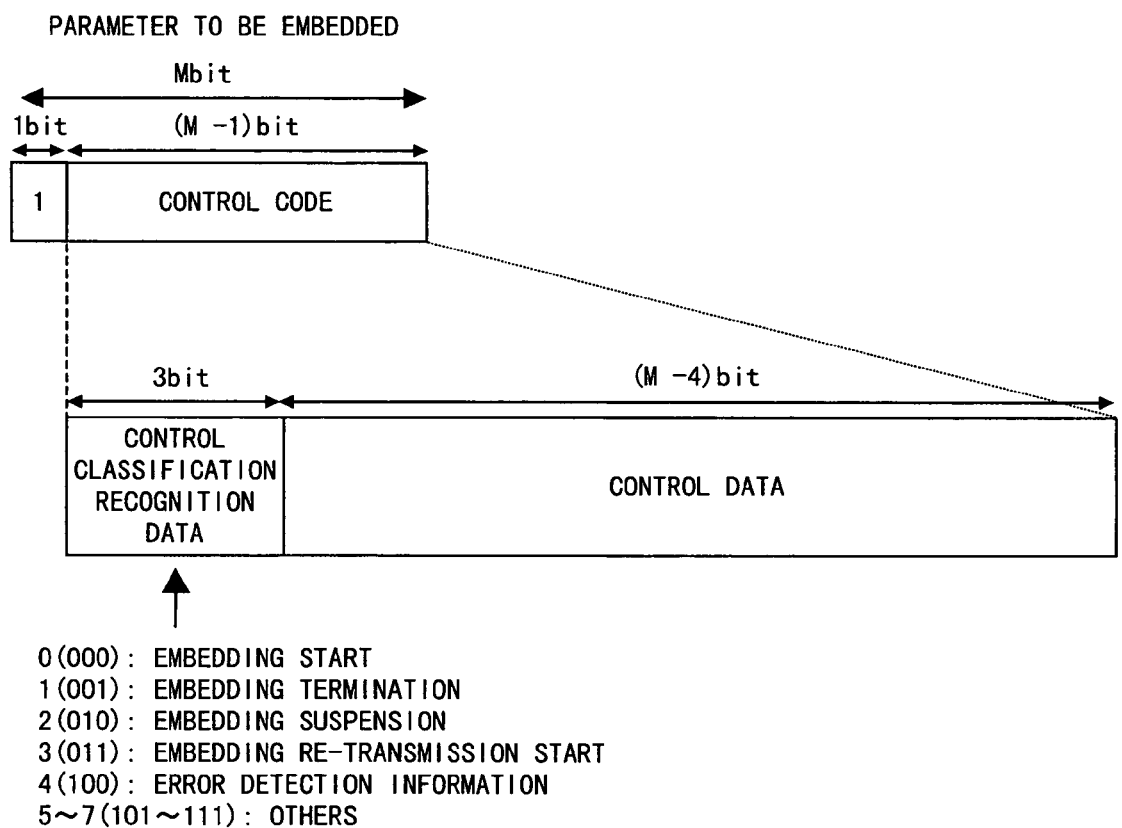
FIG. 9 is a diagram that explains the control code in FIG. 8.

FIG. 9 is a diagram explaining an example of the contents of a control code in FIG. 8. As mentioned above, (M-1) bits that are obtained by subtracting one bit of MSB from the embedding target parameter of M bits are used for a storage region of a control code. Furthermore, among these (M-1) bits, three bits on an MSB side are used for control classification recognition data and other (M-4) bits are used to store control data.

In the present preferred embodiment, at least five types of control classification recognition data, such as the embedding start, the embedding termination, the embedding suspension, the embedding re-transmission start and error detection information are used, three bits of the control classification recognition data are used to distinguish these types.

In the data extraction unit on the reception side, the contents of a control can be recognized by referring to this control classification recognition data. In the case of error detection information, for example, information about the normal reception data amount is embedded in control data to be transmitted, which is described later. In the case where specific data is not required as control data, an optional bit series, for example, a random bit series is stored as control data to be transmitted.

Figure 10:
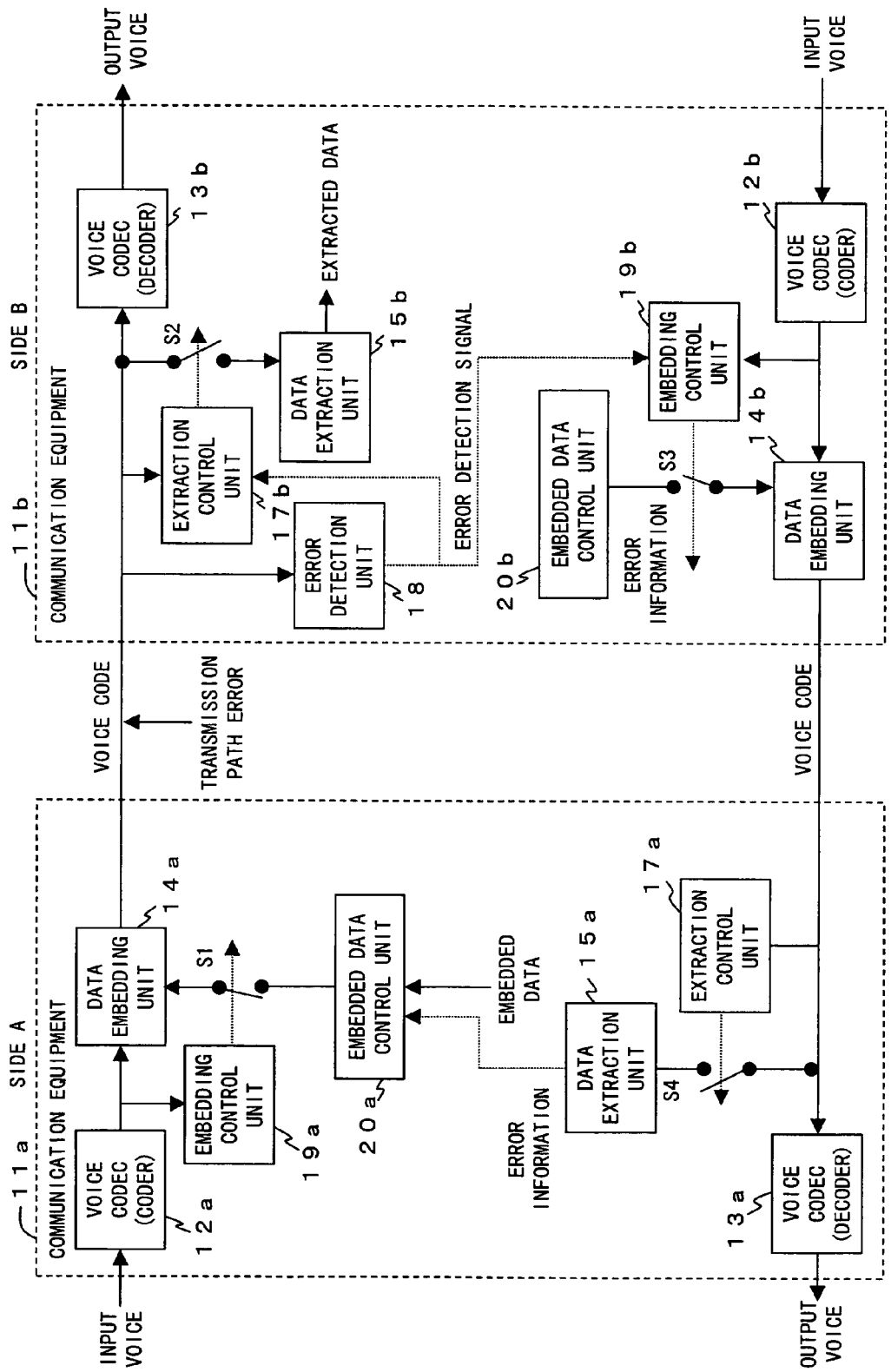
FIG. 10 is a configuration block diagram that shows a first preferred embodiment of the present invention of the interactive communication system.

The following is the detailed explanation of the preferred embodiment of a communication system in the present invention. FIG. 10 is the configuration block diagram of a first preferred embodiment of an interactive communication system. According to the first preferred embodiment, when optional embedding data is embedded in voice code to be transmitted from the side A to the side B in the same way as in FIG. 3, a communication error is generated due to a transmission path error and this error is detected on the side B. Then, the detected error is embedded in voice code data that is transmitted from the side B to the side A and the embedded data is transmitted to the side A. On the side A, re-transmission of optional embedded data to the side B is implemented from the beginning of the embedded data.

Meanwhile, in all the preferred embodiments of the present invention, when a control code such as error detection information is required to be transmitted while optional embedding data is embedded in voice data to be transmitted from the side B to the side A, the control code is embedded in the storage region of the above-mentioned algebraic codebook index to be transmitted in preference to the optional data.

In FIG. 10, data extraction units 15a, 15b are not directly connected to a voice data line via which voice code data is transmitted from a transmission side, which is different from in FIG. 3 but the operations are fundamentally the same as those in FIG. 3. An extraction control unit 17b controls the extraction of, for example, optional embedded data that is embedded in a voice code data transmitted from the side A and it controls the opening and closing of a switch S2, thereby controlling the data extraction by the extraction unit 15b as explained in FIG. 11 which is described later. Furthermore, an extraction control unit 17a controls, for example, the extraction of the error information that is embedded in the voice code data and transmitted from the side B, by the data extraction unit 15a.

An error detection unit 18 detects a communication error caused by a transmission path error from the voice code data that is transmitted from the side A. This error detection method includes an optional method such as a method of detecting the omission of the sequence number of a packet, a method of detecting a bit error of the error-detection code that is added to, for example, voice code data, etc.

In the case where an error is detected, the error detection unit 18 outputs error detection signals to the extraction control unit 17b and an embedding control unit 19b. The extraction control unit 17b opens the switch S2 and suspends the data extraction by the data extraction unit 15b. At the same time, the error detection unit 18 directs the embedding control unit 19b to close a switch S3. Then, the error information that is outputted by an embedded data control unit 20b is embedded in voice code data by the data embedding unit 14b to be transmitted to the side A.

On the side A, the error information is extracted by the data extraction unit 15a from the transmitted voice code data. The thus-extracted error information is given to an embedded data control unit 20a and this unit controls the re-transmission of optional embedded data.

FIG. 11 shows a flowchart of the processes of the embedding control units 19a and 19b of FIG. 10. When the processing of an input frame is started in the same drawing, the value of an algebraic codebook gain is extracted from the voice code data that is inputted from a voice CODEC (coder) in step S1. It is determined in step S2 whether or not the value of the gain is equal to or less than the threshold. In the case where the gain is less than the threshold, a switch S1 or the switch S3 is closed in step S3 and the processing for the frame terminates. In the case where the gain is equal to or greater than the threshold in step S2, the switch S1 or S3 is opened in step S4 and the processing for the frame terminates.

Figure 12:
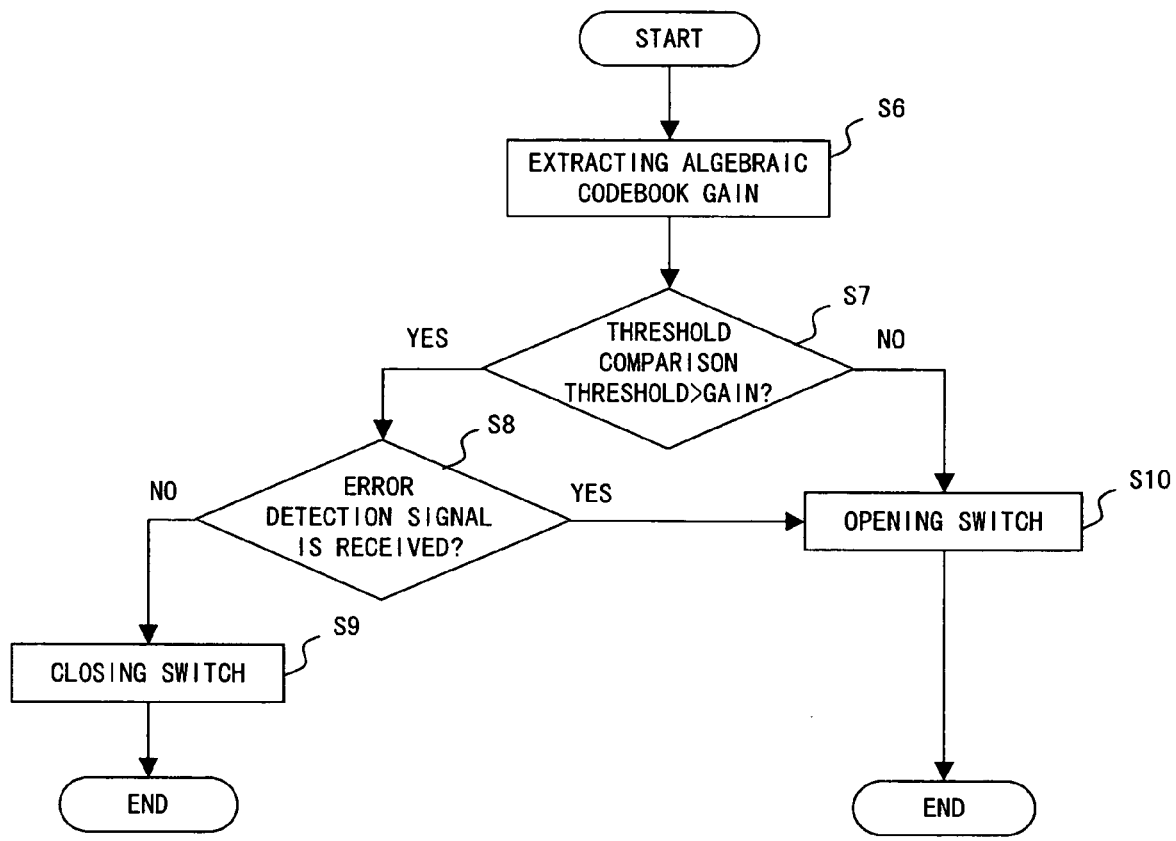
FIG. 12 a flowchart of the processes of an extraction control unit before an error is detected.
Figure 13:
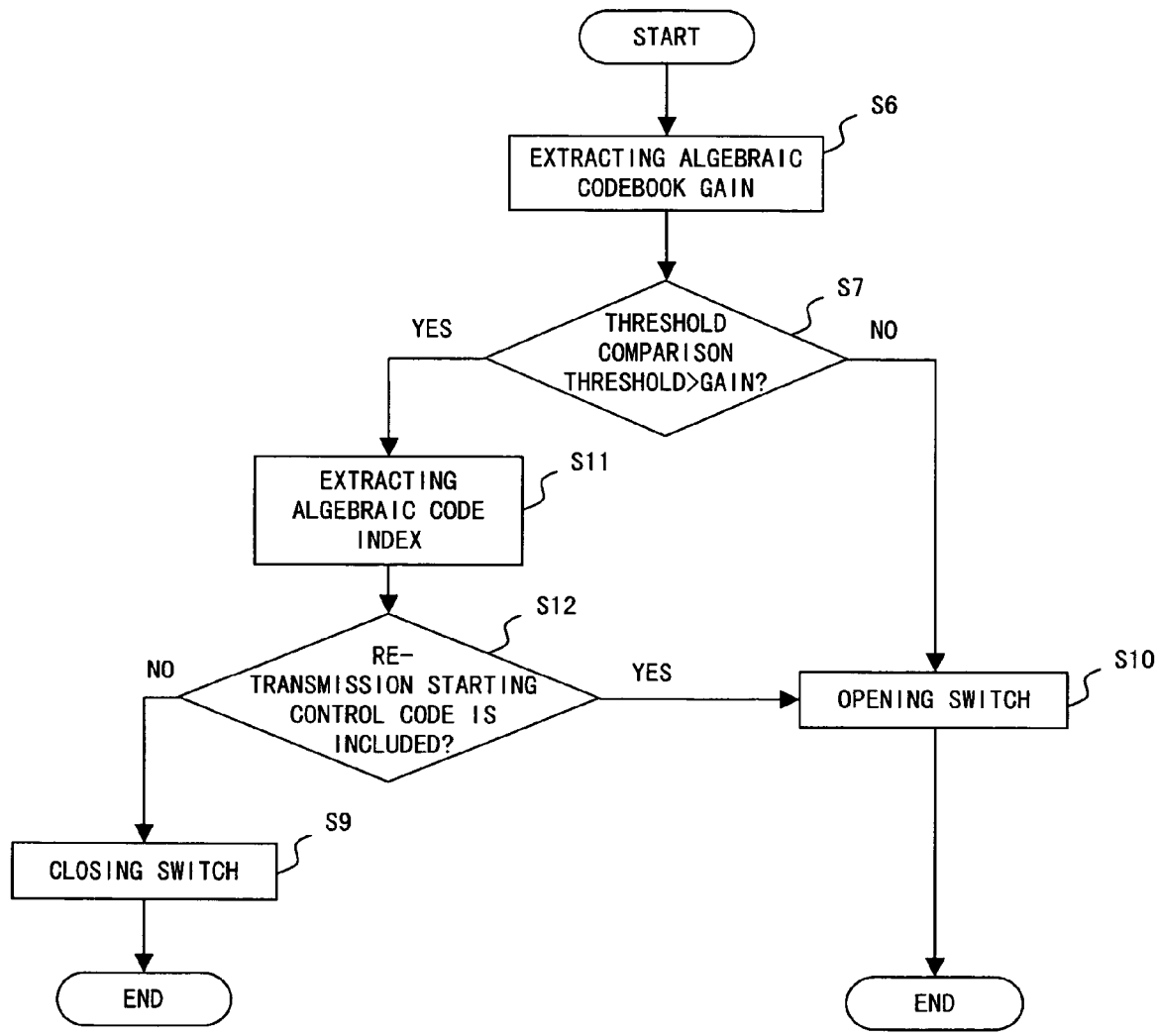
FIG. 13 is a flowchart of the processes of the extraction control unit after an error is detected.

FIGS. 12 and 13 are flowcharts of the processes of extraction control units 17a and 17b. FIG. 12 shows the processes before a communication error is detected while FIG. 13 shows the processes after an error is detected.

When a processing is started in FIG. 12, the gain of an algebraic codebook is extracted in steps S6 and S7 in the same way as in FIG. 11 and the extracted gain is compared with the threshold. In the case where the gain is less than the threshold, it is determined in step S8 whether or not an error detection signal is received from the detection unit 18. In the case where the signal is not received, the switch S2 or a switch S4 is closed in step S9 and the processing for the frame terminates. In the case where the gain is equal to or greater than the threshold in step S7 or in the case where the detection signal is received in step S8, the switch S2 or S4 is opened in step S10 and the processing for the frame terminates. Meanwhile, the detection of an error is implemented by the error detection unit 18 before the data extraction is implemented by a data extraction unit and the data decoding is implemented by a voice decoder.

When the processing is started in FIG. 13, the processes in steps S6 and S7 are implemented. In the case where the value of the gain is less than the threshold, an algebraic codebook index, that is, embedded data as an embedding target parameter that is explained in FIG. 8 is extracted in step S11. Then, it is determined in step S12 whether or not a control code for starting re-transmission of embedded data that is explained in FIG. 9 is included in the embedded data. In the case where the code is embedded, the switch S2 or S4 is closed in step S9, the processing for the frame terminates.

Also, in the case where the value of the gain is equal to or greater than the threshold in step S7 and in the case where the control code for starting the re-transmission of embedded data is not included in the embedded data in step S12, the switch S2 or S4 is opened in step S10 and the processing for the frame terminates. In other words, after an error is detected, the extraction of data is not implemented by a data extraction unit until the control code of starting the re-transmission of embedded data is detected even if the gain is less than the threshold.

Figure 14:
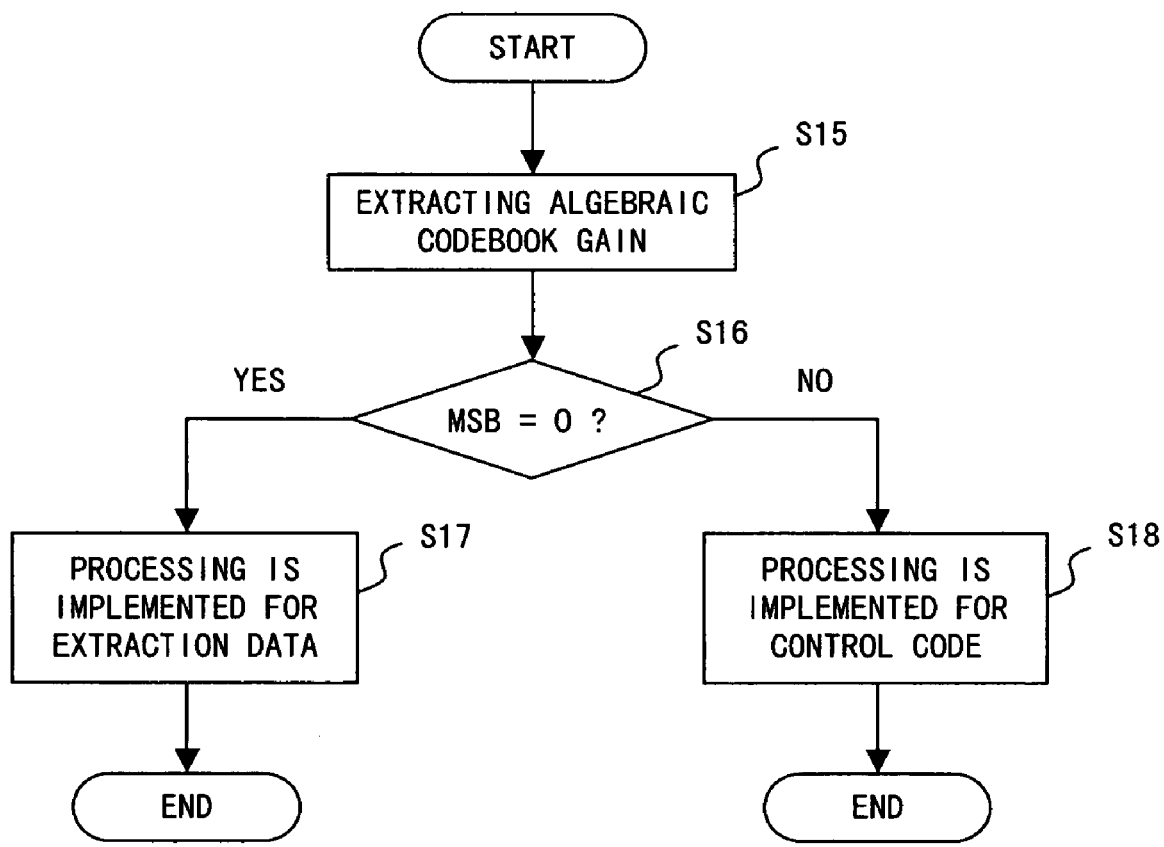
FIG. 14 is a flowchart of the processes of a data extraction unit.

FIG. 14 is a flowchart of processes of the data extraction units 15a and 15b. When a processing is started in the same drawing, the embedded data corresponding to an algebraic codebook index is extracted in step S15. In step S16, it is determined whether or not the value of one bit on the MSB side is "0". In the case where the value is "0", the processing for optional extracted data is implemented in step S17 and the processing terminates. Furthermore, in the case where the value of one bit on the MSB side is "1", the processing for the control code is implemented in step S18 and the processing terminates.

Figure 15:
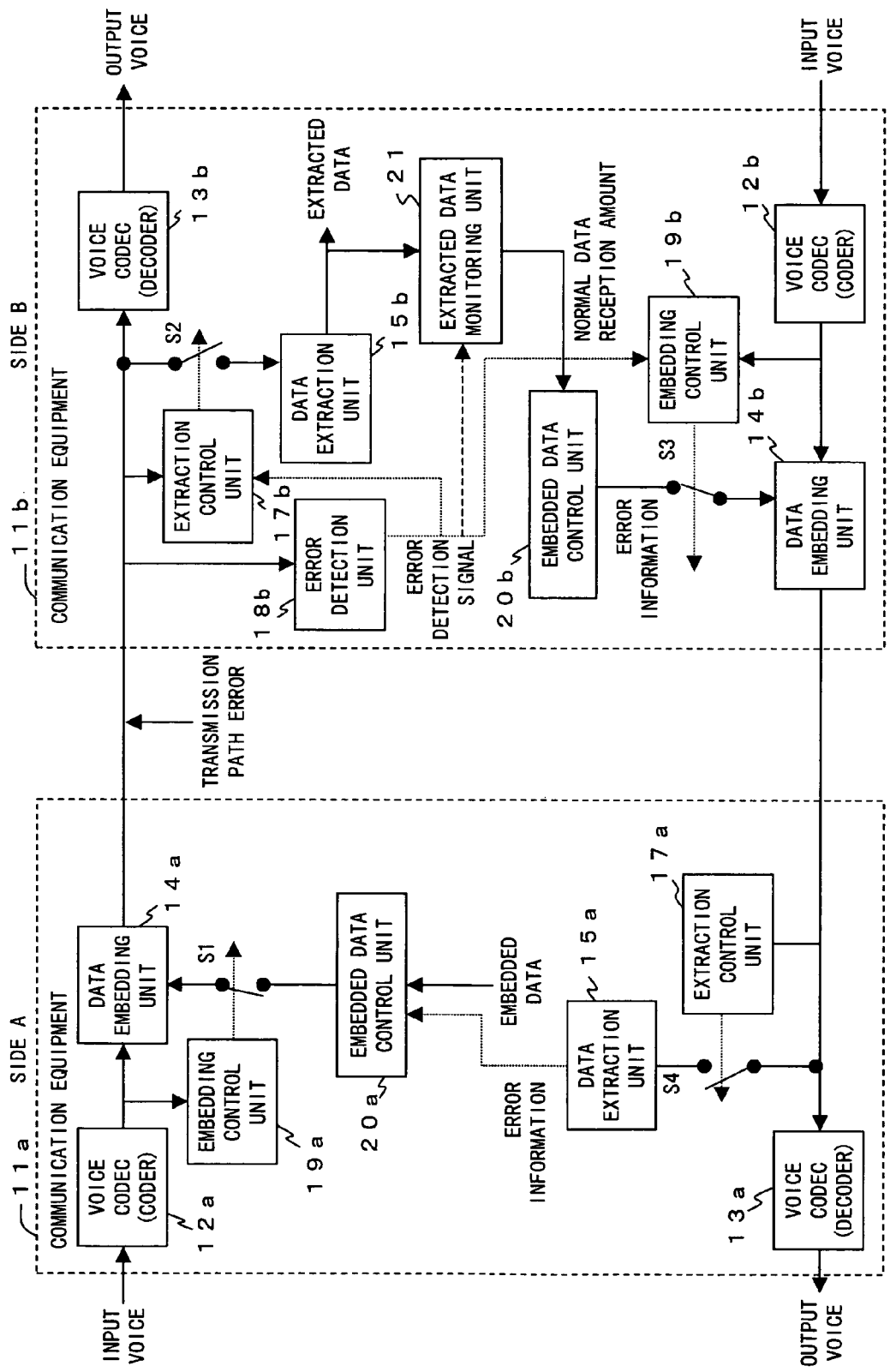
FIG. 15 is the configuration block diagram of a second preferred embodiment of the present invention of the interactive communication system.

FIG. 15 is the configuration block diagram of a second preferred embodiment of an interactive communication system. When the second preferred embodiment in this drawing is compared with the first preferred embodiment in FIG. 10, there is a fundamental different point such that an extracted data monitoring unit 21 that is connected to the data extraction unit 15b is provided on the side B in FIG. 15. As explained in FIG. 9, the extracted data monitoring unit 21 monitors the extracted data amount that is extracted by the data extraction unit 15b, in other words, a normal data reception amount when and after the data in which a code showing the embedding start as a control code is embedded is transmitted from the side A. When a communication error is detected by the error detection unit 18, the normal data reception amount is outputted to the embedded data control unit 20b. The embedded data control unit 20b adds this normal data reception amount to the error information only about error detection that is explained in FIG. 10 and then this normal data reception amount is stored as the control data of FIG. 9. Then, the embedding of the data is implemented and the thus-embedded data is transmitted to the side A.

On the side A, the normal data reception amount in the error information that is extracted by the data extraction unit 15a is given to the embedded data control unit 20a. Then, the embedded data control unit 20a controls the re-transmission of embedded data except for the data that is already received normally on the side B from among embedded data. In this way, the re-transmission of embedded data that is already received normally on the side B can be omitted, which is different from the first preferred embodiment as shown in FIG. 10.

In the present preferred embodiment, optional data of up to thirty-three bits can be embedded for each frame as mentioned above. Therefore, in the case where one data to be embedded is mass data, this data to be embedded is divided into a plurality of frames to be embedded. Accordingly, the re-transmission of embedded data can be implemented by eliminating the data that is received normally on the side B. Meanwhile, the processing by the embedded data control unit 20a is explained in reference to a next third preferred embodiment.

Figure 16:
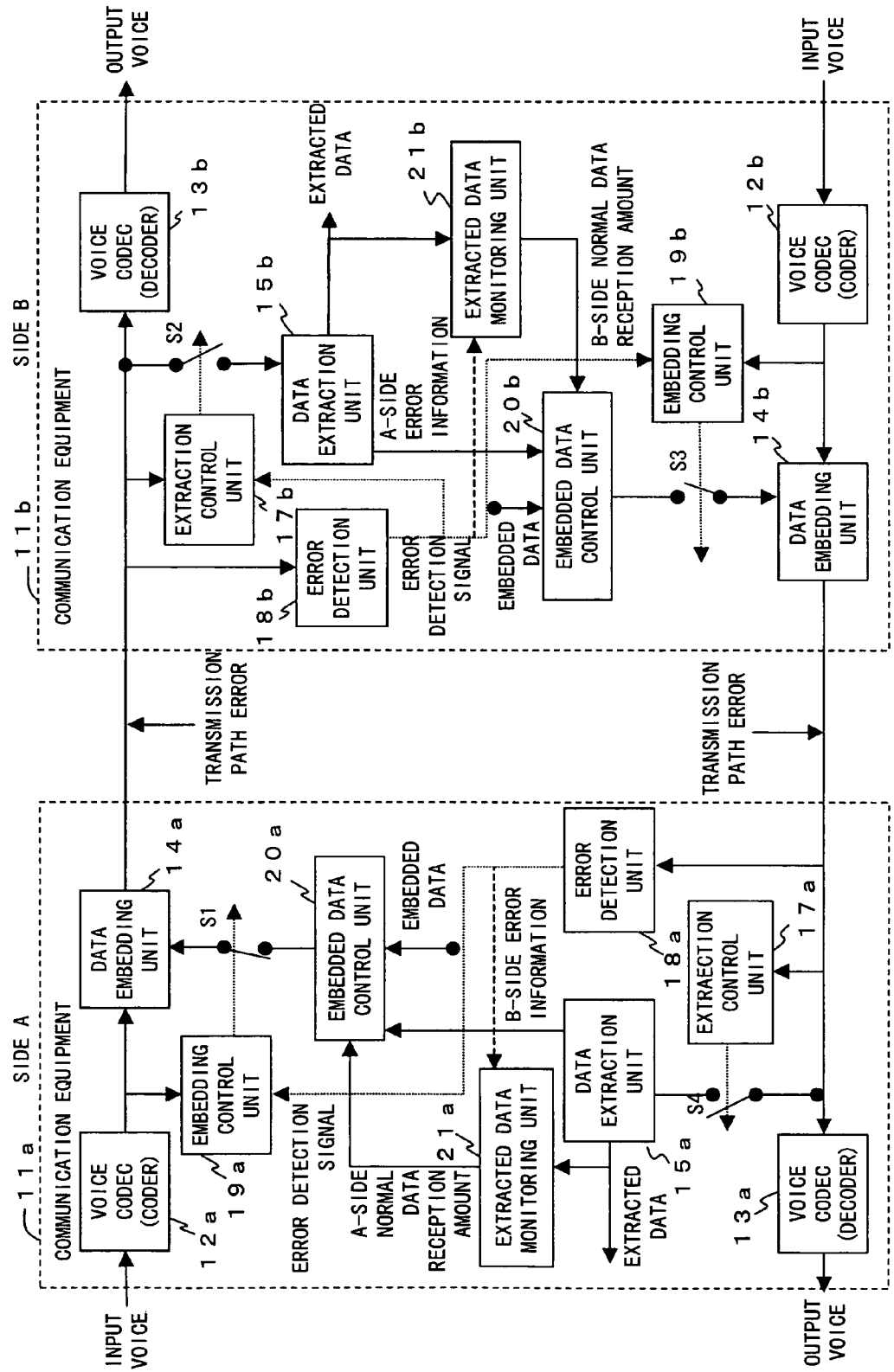
FIG. 16 is a configuration block diagram that shows a third preferred embodiment of the present invention of the interactive communication system.
Figure 18:
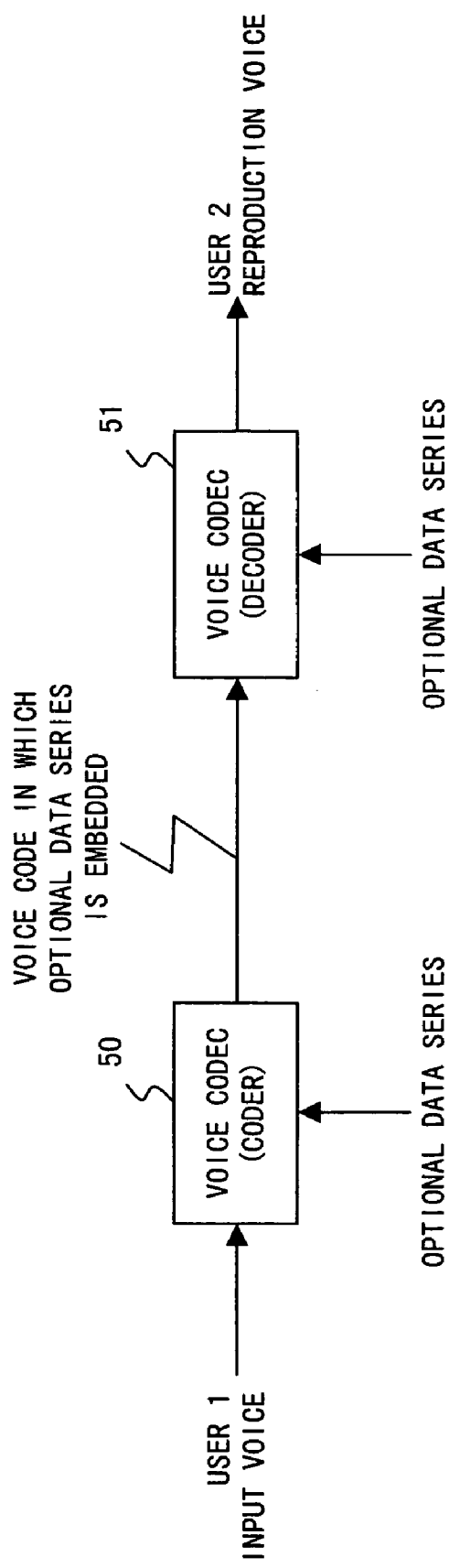
FIG. 18 is a block diagram that explains the application of a data embedding technology in a conventional voice communication system.
Figure 19:
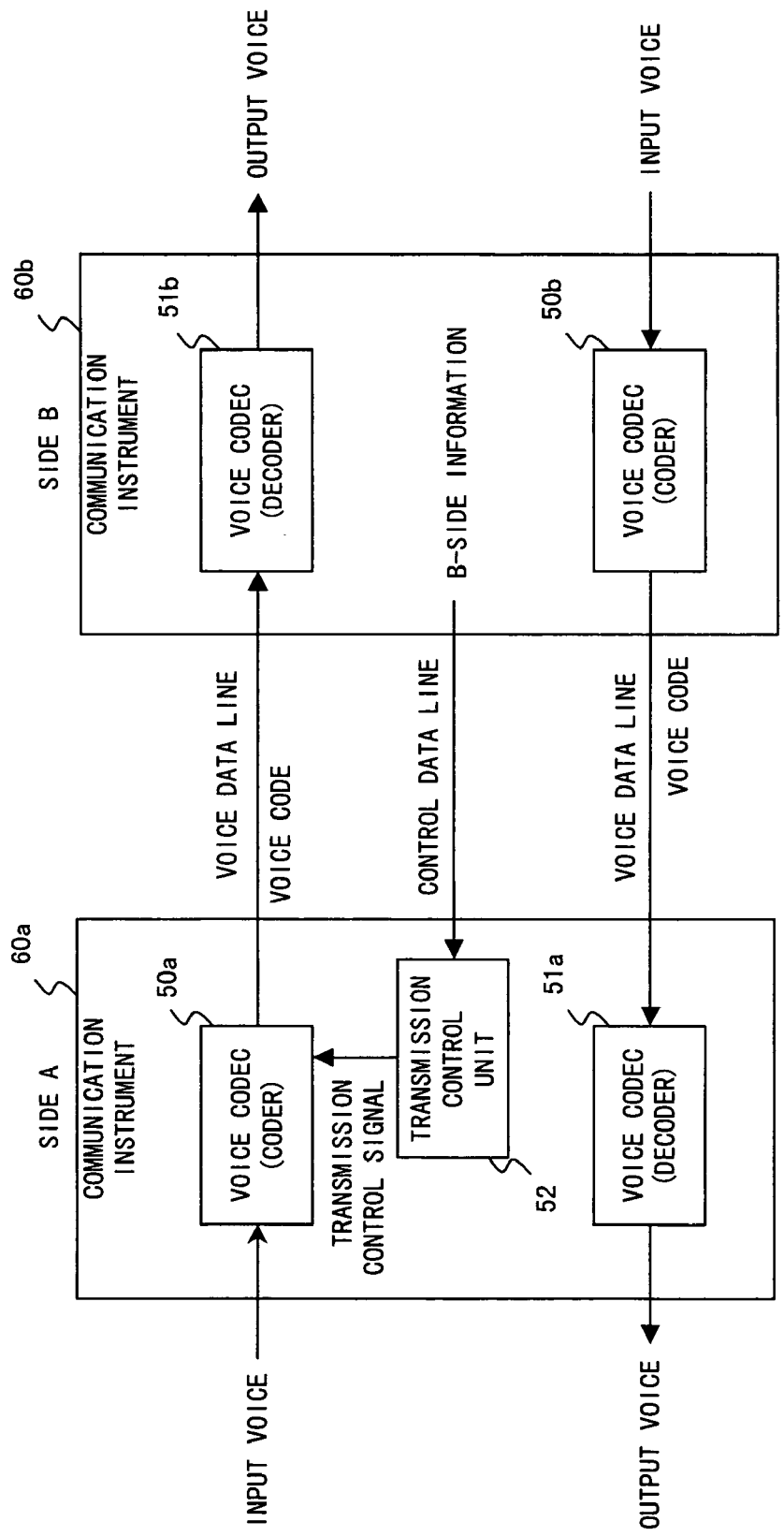
FIG. 19 is a diagram that shows the first conventional example of the interactive communication system of transmitting control data.
Figure 20:
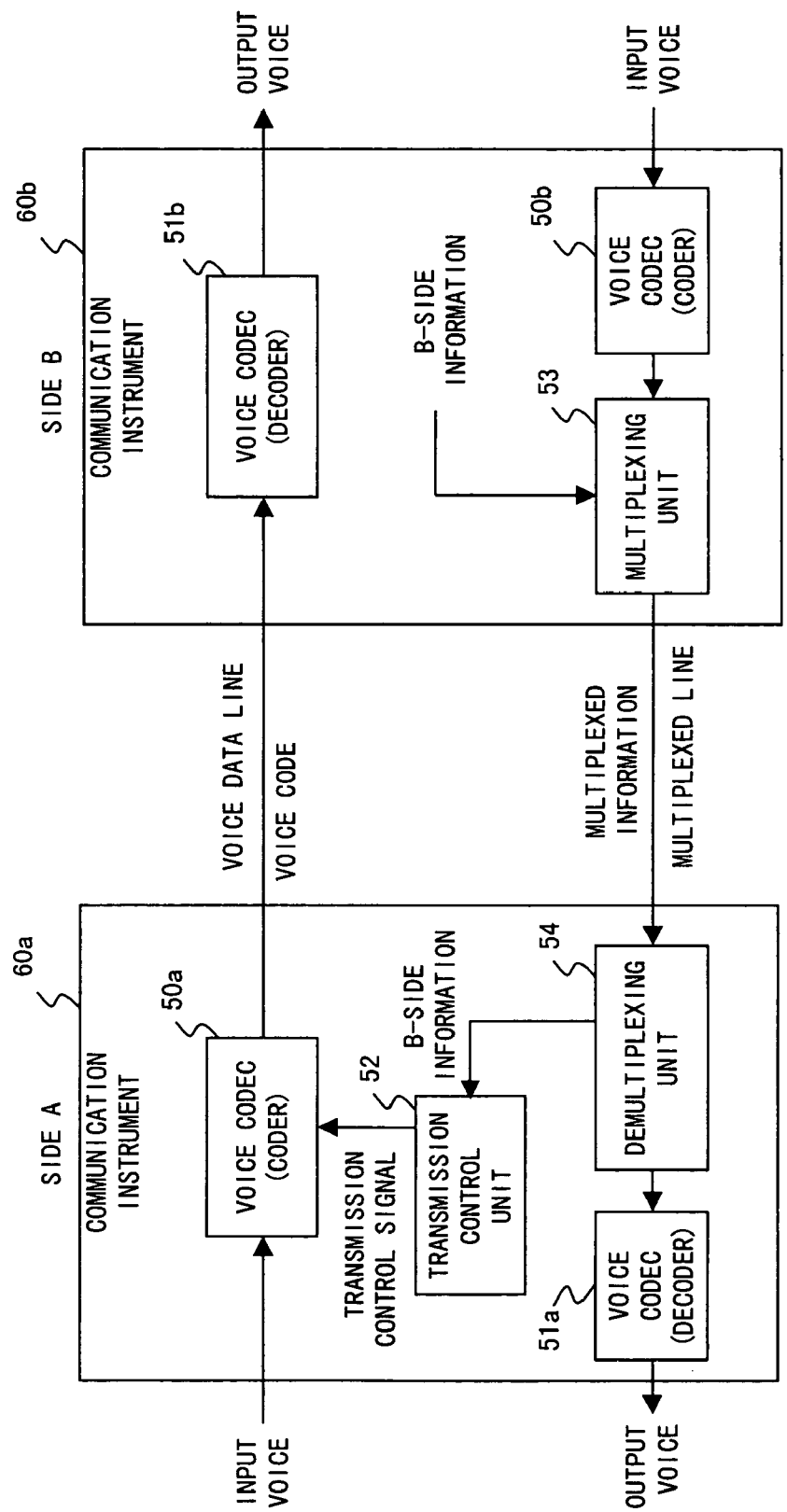
FIG. 20 is a diagram that shows the second conventional example of the interactive communication system of transmitting control data.

FIG. 16 is the configuration block diagram of the third preferred embodiment of an interactive communication system. In FIGS. 1 to 15, the simplified explanation is made in such a way that optional data is embedded only in a voice code data transmitted from the side A to the side B in accordance with the fact that communications are implemented based on an interactive communication system. This third preferred embodiment, however, shows a system configuration in the case where optional data is embedded even in the voice code data that is transmitted from the side B to the side A, which is different from the simplified explanation.

Therefore, in FIG. 16, an error detection unit 18a and an extracted data monitoring unit 21a are provided also on the side A. The following is the explanation in the case where a communication error caused by a transmission path error, etc. is monitored in the communications from the side B to the side A. At first, the communication error is detected by the detection unit 18a. The data amount that is extracted on the side A until the communication error is detected, in other words, the A-side normal data reception amount, together with the error information by a control of the embedded data control unit 20a is embedded in voice code data by the data embedding unit 14a. Then, the thus-embedded data is transmitted to the side B.

On the side B, the re-transmission of the embedded data except for the data that is normally received before an error is detected on the side A is controlled by the embedded data control unit 20b using the A-side normal data reception amount in the A-side error information that is extracted by the data extraction unit 15b. The normal data reception amount outputted from the extracted data monitoring unit 21 to the embedded data control unit 20b in FIG. 15 corresponds to the B-side normal data reception amount in FIG. 16. Furthermore, the error information that is outputted from the data extraction unit 15a to the embedded data control unit 20a corresponds to the B-side error information.

FIG. 17 is the functional configuration block diagram that shows the operations of an embedded data control unit. In the same drawing, a switch S turns ON on the side of a terminal b in the case of embedding general optional data. The optional data that is read in by an embedded data reading unit 22 is outputted to a data embedding unit. The embedded data reading unit 22 reads in thirty-three bits of embedded data and adds distinction information of one bit, that is, "0" here on the MSB side as mentioned before in order to distinguish optional data from a control code, thereby outputting a bit series of thirty-four bits.

A control code generation unit 23 generates a control code as occasion demands and sends a control code output notice to an output control unit 24. Corresponding to this operation, the switch S is turned ON on the side of a terminal a by the output control unit 24 and the control code is outputted to a data embedding unit.

For example, when embedded data is firstly given to the embedded data control unit 20a or when the embedding of data to be embedded terminates, a notice informing whether or not the embedded data is present is given to the control code generation unit 23 from the embedded data reading unit 22. Corresponding to this notice, the control code generation unit. 23 generates a control code including the control classification recognition data that shows the above-mentioned embedding start or the embedding termination, thereby outputting this code to a data embedding unit. In other words, this unit generates a control code of thirty-three bits that include, for example, a random bit series according to the contents of the control and it adds "1" to the side of MSB as the recognition information of one bit, thereby outputting a bit series of thirty-four bits.

In FIG. 16, when the A-side normal data reception amount is given from the extracted data monitoring unit 21 to the embedded data control unit 20a, a control code having control data of FIG. 9 in which the A-side normal data reception amount is stored is generated by the control code generation unit 23 of FIG. 17 and the thus-generated control code is outputted to the data embedding unit 14a. Then, the thus-outputted code is embedded in voice code data to be transmitted to the side B and the thus-transmitted code is extracted by the data extraction unit 15b on the side B to be used as A-side error information.

The B-side error information that is given to a B-side error data processing unit 25 of FIG. 17 is given from the data extraction unit 15a of FIG. 16 and it includes the information about the normal data reception amount on the side B. The B-side error data processing unit 25 outputs this data reception amount to the embedded data reading unit 22 and at the same time it outputs an error notice to the control code generation unit 23.

The control code generation unit 23 generates a control code including the control classification recognition data used for a re-transmission start of the embedded data that is shown in FIG. 9 and it outputs the thus-generated code to the data embedding unit. The embedded data reading unit 22 starts the reading of embedded data by eliminating a data amount that is notified from the B-side error information processing unit 25 and that is normally received on the side B, from the beginning of the read-in data. Then, the switch S turns ON on the side of the terminal b after a re-transmission start code of embedded data to the side B is embedded and the embedded control code is transmitted. Then, the read-in data is outputted to the data embedding unit and the embedding of data in voice code data is resumed.

As mentioned above, a control of the communication system using an embedding data operation in the interactive voice communication system that uses a CELP system is explained in detail. The present invention is neither limited to a CELP system nor limited to a voice communication system so that it is natural that the present invention can be applied to various types of interactive communication systems.

As explained above in detail, according to the present invention, the information for controlling the communications from a transmission side can be embedded in communication data without changing the format of the communication data and the thus-embedded data can be transmitted. Therefore, a communication control on the transmission side can be implemented utilizing the information that is obtained on the reception side neither requiring another transmission path for transmitting the control information nor increasing the transmission amount of communication data which is caused by transmitting the control information.

In addition, it becomes possible to re-transmit embedded data by detecting a communication error on the reception side or re-transmit embedded data by eliminating the data that is normally received before an error is detected, which greatly contributes the improvement of the practicality of communications in an interactive communication system.

INDUSTRIAL APPLICABILITY

The present invention is not limited to communication industry the main business of which is to implement communications so that it can be used in all kinds of industries that utilize communications such as among a main office and branch offices, among factories, etc. using an interactive communication system.

What is claimed is:

1. Communication equipment in an interactive communication system including a plurality of communication equipments that are connected to each other via a communication line, comprising:
   an error reception unit to receive reception error information at a reception side;
   a transmission control unit to control transmission from a transmission side to the reception side using the reception error information;
   an error detection unit to detect transmission error on transmission from the reception side;
   an error notification unit to notify the reception side of the transmission error when the transmission error is detected;
   a control information embedding unit to embed control information that is used for controlling communications from the reception side, in a normal communication data without changing a format of voice code data in a voice communication,
   wherein the control information that is obtained on the reception side is information that shows a condition of a communication line from the transmission side to the reception side,
   wherein the error detection unit detects, when communications are implemented by embedding other optional data in main communication data in communications from the transmission side to the reception side, an error of communication data, and
   wherein, when the error of communication data is detected due to a condition of the communication line, the control information embedding unit embeds information about the error detection as the control information; and
   a normal data reception amount monitoring unit to monitor a reception amount of the other optional data before the error of communication data is detected,
   wherein the control information embedding unit further embeds a normal data reception amount in addition to the information about the error detection when the error of communication data is detected.

2. The communication equipment in an interactive communication system according to claim 1, wherein
   when the interactive communication system is a voice communication system that uses a CELP (Code Excited Linear prediction) coding system and the other optional data is embedded in voice code data, a determination parameter that is used to determine whether or not embedded data is present in a frame, a threshold for the determination parameter and a data embedding target parameter in a frame are agreed mutually between the transmission side and the reception side.

3. The communication equipment in an interactive communication system according to claim 1, wherein
   when control information that is used for a control of communications from the transmission side is obtained while implementing communications by embedding still other optional data in main communication data that is transmitted to the transmission side, the control information embedding unit embeds the control information in preference to the other optional data.

4. An interactive communication system including a plurality of communication equipments that are connected via a communication line to each other, comprising:
   a first communication equipment provided with:
      an error reception unit to receive reception error information at a reception side;
      a transmission control unit to control transmission from a transmission side to the reception side using the reception error information;
      an error detection unit to detect transmission error on transmission from the reception side;
      an error notification unit to notify the reception side of the transmission error when the transmission error is detected; and
      a control information embedding unit to embed control information that is used for a control of communications from a side of a communication partner to an own communication equipment, in a normal communication data without changing a format of voice code data in a voice communication;
   a second communication equipment provided with a communication control unit for controlling communications to a side of the first communication equipment using control information embedded in communication data that is transmitted from the first communication equipment,
   wherein the control information that is obtained on the reception side is information that shows a condition of a communication line from the transmission side to the reception side,
   wherein the error detection unit detects, when communications are implemented by embedding other optional data in main communication data in communications from the transmission side to the reception side, an error of communication data, and
   wherein, when the error of communication data is detected due to a condition of the communication line, the control information embedding unit embeds information about the error detection as the control information; and
   a normal data reception amount monitoring unit to monitor a reception amount of the other optional data before the error of communication data is detected,
   wherein the control information embedding unit further embeds a normal data reception amount in addition to the information about the error detection when the error of communication data is detected.

5. The interactive communication system according to claim 4, wherein:
   when communications are implemented by embedding the other optional data in the main communication data in communications from the second communication equipment to the first communication equipment, the error detection unit detects an error of the communication data and when an error of the communication data is detected, the control information embedding unit embeds information about the detected error as the control information; and the second communication equipment further comprises an embedding re-execution controlling unit to control re-execution of embedding the other optional data in accordance with the information about the detected error transmitted from the first communication equipment.

6. The interactive communication system according to claim 5, wherein:

the first communication equipment further comprises a normal data reception amount monitoring unit to monitor a normal reception amount of other optional data embedded in main communication data transmitted from the second communication equipment and, when the error of the communication data is detected, the control information embedding unit embeds information about a normal data reception amount before the error is detected as the control information in addition to information about the detected error; and an embedding re-execution controlling unit on a side of the second communication equipment controls re-execution of embedding the other optional data by eliminating a part shown by the normal data reception amount.

7. A communication control method in an interactive communication system including a plurality of communication equipments that are connected to each other via a communication line, comprising:

receiving reception error information at a reception side;

controlling transmission to the reception side from a transmission side using the reception error information;

detecting transmission error on transmission from the reception side;

notifying the reception side of the transmission error when the transmission error is detected;

embedding, on a side of a first communication equipment, control information that is used for a control of communications from a side of a second communication equipment in a normal communication data without changing a format of voice code data in a voice communication;

controlling, on the side of the second communication equipment, communications to the side of the first communication equipment using control information transmitted from the side of the first communication equipment, wherein the control information that is obtained on the reception side is information that shows a condition of a communication line from the transmission side to the reception side, wherein the error detection step detects, when communications are implemented by embedding other optional data in main communication data in communications from the transmission side to the reception side, an error of communication data, and wherein, when the error of communication data is detected due to a condition of the communication line, the control information embedding step embeds information about the error detection as the control information; and monitoring a reception amount of the other optional data before the error of communication data is detected, wherein the control information embedding step further embeds a normal data reception amount in addition to the information about the error detection when the error of communication data is detected.

* * * * *

UNITED STATES PATENT AND TRADEMARK OFFICE
CERTIFICATE OF CORRECTION

PATENT NO.       : 7,949,016 B2
APPLICATION NO.  : 11/111759
DATED            : May 24, 2011
INVENTOR(S)      : Yoshiteru Tsuchinaga et al.

It is certified that error appears in the above-identified patent and that said Letters Patent is hereby corrected as shown below:

Column 16, Line 10, In Claim 3, before "other" delete "still".

Signed and Sealed this
Sixteenth Day of August, 2011

David J. Kappos
*Director of the United States Patent and Trademark Office*